United States Patent [19]

Kono et al.

[11] Patent Number: 5,110,873

[45] Date of Patent: May 5, 1992

[54] THERMOSETTING RESIN COMPOSITION

[75] Inventors: Yoshimi Kono, Amagasaki; Sabee Maeda, Osaka, both of Japan

[73] Assignee: Osaka Soda Co., Ltd., Osaka, Japan

[21] Appl. No.: 673,267

[22] Filed: Mar. 21, 1991

Related U.S. Application Data

[63] Continuation of Ser. No. 259,913, Oct. 19, 1988, abandoned, which is a continuation-in-part of Ser. No. 65,421, Jun. 23, 1987, abandoned.

[51] Int. Cl.$^5$ .................... C08F 4/34; C08F 265/06
[52] U.S. Cl. ................... 525/305; 524/394; 524/409; 524/451; 524/495; 525/100; 525/244; 525/263
[58] Field of Search ................... 525/305, 263

[56] References Cited

FOREIGN PATENT DOCUMENTS 110725 6/1985 Japan .................... 525/305
133003 7/1985 Japan .................... 525/305

Primary Examiner—Jacob Ziegler
Attorney, Agent, or Firm—Sherman and Shalloway

[57] ABSTRACT

A thermosetting resin composition comprising
(A) 60 to 95% by weight of a prepolymer or precopolymer selected from the group consisting of (A-1), (A-2) and (A-3) below,
(A-1) a prepolymer of diallyl phthalate,
(A-2) a precopolymer of diallyl terephthalate derived from diallyl terephthalate of the following formula (1)

$$H_2C=CHCH_2OOC-\text{C}_6H_4-COOCH_2CH=CH_2 \quad (1)$$

and an aromatic benzyl hydrocarbon having at least one hydrogen atom at the benzyl position and represented by the following formula (2)

$$\text{Ph}\!-\!\left[\text{CH}\begin{array}{c}R^1\\R^2\end{array}\right]_n \quad (2)$$

wherein each of $R^1$ and $R^2$ represents a member selected from the class consisting of a hydrogen atom and lower alkyl groups, and n is an integer of 1 to 3, and (A-3) a mixture of (A-1) and (A-2), and (B) 40 to 5% by weight of a polyacrylate or polymethacrylate of dipentaerythritol having at least 4 acryloyl or methacryloyl groups in the molecule and represented by the following formula $$R^3OH_2C-\underset{\underset{CH_2OR^3}{|}}{\overset{\overset{CH_2OR^3}{|}}{C}}-CH_2-O-CH_2-\underset{\underset{CH_2OR^3}{|}}{\overset{\overset{CH_2OR^3}{|}}{C}}-CH_2OR^3$$

wherein each $R^3$ represents a hydrogen atom, —COCH=CH$_2$ or $$-\text{COC}=CH_2,$$
$$\phantom{-\text{CO}}|$$
$$\phantom{-\text{COC}}CH_3$$

and at least four $R^3$ groups represents —COCH=CH$_2$ or $$-\text{COC}=CH_2.$$
$$\phantom{-\text{CO}}|$$
$$\phantom{-\text{COC}}CH_3$$

5 Claims, No Drawings

THERMOSETTING RESIN COMPOSITION

This application is a continuation of application Ser. No. 07/259,913, filed Oct. 19, 1988, which is a continuation-in-part of application Ser. No. 07/065,421 filed Jun. 23, 1987, both abandoned.

This application is a continuation-in-part application of Ser. No. 065,421 filed on Jun. 23, 1987.

This invention relates to a thermosetting diallyl phthalate resin composition useful as a molding material for production of shaped articles such as laminated boards, electrical component parts, electronic component parts, machine component parts and medical and hygienic articles and a shaped article therefrom.

The thermosetting composition of this invention can give shaped articles having excellent heat resistance, dimensional stability, chemical resistance, mechanical strength and electrical insulation and especially high surface hardness.

The present invention provides a thermosetting resin composition suitable for use as an impregnating resin in the production of laminated boards, such as decorative boards, top panels of desks, counters and the like and printed circuit boards, by laminating several resin-impregnated fibrous substrates, or laminating the impregnated fibrous substrates to a plywood or a metallic plate, and consolidating them under heat and pressure to shape them and cure the resin.

More specifically, the invention provides a thermosetting resin composition which is useful as a molding material for electric and electronic component parts such as connectors, commutators of motors, governors, coil bobbins, relays, switches, terminal boards, ignitions, breakers, sockets, encapsulating agents for electronic components and elements, and insulating materials, machine component parts such as pistons of plastic brakes, tableware and other daily goods, and medical and hygienic materials such as trays or containers which can be sterilized with chemicals or stream.

Laminated boards and other various shaped articles which can be obtained from the thermosetting resin composition of this invention exhibit properties meeting the requirements of the individual uses to which they are put and have markedly improved surface hardness and heat resistance (particularly, cigarette resistance).

Shaped articles produced from a molding material containing a prepolymer or precopolymer of diallyl phthalate as a resin component have some difficulties in their properties, and it has been desired to improve such properties. In particular, their heat resistance and surface hardness raise a problem and limits the utilization of conventional diallyl phthalate resin compositions.

When a molding material comprising a prepolymer or precopolymer of diallyl phthalate as a resin component is to be used for the production of a laminated board such as a decorative board, it has excellent moldability and post-formability, and the resulting decorative board has excellent physical and chemical properties and a subdued appearance and feel. But when this decorative board is used as a top panel board of desks or counters, it frequently undergoes marked damage by lighted cigarettes or by knives, forks or various containers made of glass, porcelain, etc. Thus, such a molding material has not been highly evaluated for use in these applications.

When a conventional molding material comprising a prepolymer or precopolymer of diallyl phthalate as a resin component is used to produce such shaped articles as electrical or electronic component parts, the resulting shaped articles have excellent dimensional stability, mechanical properties and electrical properties even in a severe atmosphere such as a high-temperature high-humidity atmosphere, and are much evaluated as a highly reliable material. However, as in the case of the decorative boards, such shaped articles do not have sufficient surface hardness but remain susceptible to injury. These deleterious effects of low hardness also give rise to a problem in utilization as machine component parts, daily goods such as tableware and medical materials. This defect occurs in the form of whitening phenomenon on the surfaces of molded articles when burrs are removed from them by means of, for example, a deflasher or a tumbling mixer. In use, tableware, for example, suffers from this defect in the form of surface injury by knives, spoons, forks, etc.

Many proposals have been known heretofore on compositions comprising combinations of a prepolymer of diallyl phthalate with polyacrylates or polymethacrylates of polyhydric alcohols, and are disclosed, for example, in Japanese Patent Publications Nos. 15074/1969, 25234/1969, and 10358/1974 corresponding to British Laid-Open Patent Publication No. 1198259 and West German Laid-Open Patent Publication No. 1694930).

The polyacrylates or polymethacrylates of polyhydric alcohols [to be referred to as the poly(meth)acrylates] used in these prior proposals are, for example, glycerol trimethacrylate, trimethylolpropane trimethacrylate and pentaerythritol tetramethacrylate. Investigations of the present inventors, however, have shown that when the above polyhydric alcohol poly(meth)acrylates are used, the surface hardness and thermal stability (especially cigarette resistance) of laminated boards or various shaped articles prepared from the resulting compositions are not as high as are required. For example, when the plucking hardness of the surface of a laminated board from such a conventional composition comprising the polyhydric alcohol poly(meth)acrylate is measured under increased loads, a deeper injury occurs. Furthermore, when the surface of a shaped article from the above composition is rubbed with very fine steel wool, the gloss retention of its surface is markedly reduced. When a lighted cigarette is left on the surface of such a laminated board from the conventional polyhydric alcohol poly(meth)acrylate, the board is susceptible to coloration or carbonization. Particularly, when it was left for more that 2 minutes, the deterioration of the board is fast.

Furthermore, the following prior art exists with respect to a composition comprising a combination of a prepolymer of diallyl phthalate and an acrylate or methacrylate of dipentaerythritol.

(a) Japanese Laid-Open Patent Publication (Kokai) No. 115608/1985

This patent document discloses a thermosetting resin composition having an excellent effect of controlling the gum of wood, which comprises (A) 100 parts by weight of at least one thermosetting resin selected from unsaturated polyester resins, epoxy acrylate resins and allyl resins and (B) 10 to 200 parts by weight of a compound containing at least three acryloyl or methacryloyl groups per molecule. A specific working example of this patent document only shows the use of tri(methacryloyloxyethyl) isocyanurate as component (B) for the allyl resin as component (A).

(b) Japanese Laid-Open Patent Publication (Kokai) No. 199248/1984

This patent document discloses a process for producing a decorative sheet which comprises impregnating or coating paper or a cloth with an unsaturated polyester resin composition comprising (A) 100 parts by weight of a mixture of (a-1) 50 to 98% by weight of an unsaturated polyester and (a-2) 50 to 2% by weight of an allyl resin and (B) 0.5 to 100 parts by weight of a compound containing at least three acryloyl or methacryloyl groups per molecule, laying the impregnated or coated paper or cloth on a substrate, and consolidating the assembly under heat and pressure.

The resin composition described in this patent document contains the unsaturated polyester resin as a main component, and it does not at all describe a specific example in which a (mech)acrylate ester of dipentaerythritol is used as component (B).

(c) Japanese Patent Publication No. 4861/1986

This patent document discloses photosensitive printing inks comprising (A) 20 to 97% by weight of a vehicle curable by ultraviolet light, (B) 1 to 20% by weight of a photoinititator and (C) 0 to 65% by weight of a pigment, and states that the vehicle (A) can be formed by mixing and heating 50 to 95% by weight of a monomer or oligomer of dipentaerythritol hexaacrylate and 50 to 5% by weight of a diallyl phthalate prepolymer. The vehicle (A) contains a large amount of dipentaerythritol hexaacrylate with respect to the diallyl phthalate prepolymer. Hence, the ink composition containing this vehicle (A) cannot be formed into a shaped article even after curing.

(d) Japanese Laid-Open Patent Publication (Kokai) No. 126179/1986.

This patent document discloses an electron beam-curable coating composition comprising (A) 1 to 50% by weight of an allyl-terminated resin, (B) 10 to 70% by weight of dipentaerythritol or its derivative and (C) 1 to 40% by weight of a monomer thinner. A specific working example of this patent document describes that dipentaerythritol or its derivative (B) is used in a large amount with respect to the resin (A) and the monomer thinner is used in a relatively large amount, and that the final composition is used as a varnish for a printing ink.

The present inventors made investigations in order to develop a thermosetting diallyl phthalate resin composition which can overcome the aforesaid defects or disadvantages of a molding material comprising a prepolymer or precopolymer of diallyl phthalate as a resin component and also the aforesaid defects or disadvantages of the prior art.

These investigations led to the discovery that when a specific combination of the above resin component with a specific polyacrylate or polymethacrylate of a polyhydric alcohol is used, very superior improved properties can be obtained, and excellent test results are obtained in the above-mentioned tests; and that this specific combination leads to a thermosetting resin composition capable of giving a laminated board or a shaped article having surface hardness and heat resistance which fully endure actual use conditions.

The present inventors furthered their investigations on the basis of the above discovery, and now found that a thermosetting resin composition for obtaining a shaped article comprising a combination of component (A) and component (B) shown below gives shaped articles having outstandingly superior properties, especially surface hardness and heat resistance.

(A) 60 to 95% by weight of a prepolymer or precopolymer selected from the group consisting of (A-1), (A-2) and (A-3) below, (A-1) a prepolymer of diallyl phthalate, (A-2) a precopolymer of diallyl terephthalate derived from diallyl terephthalate of the following formula (1)

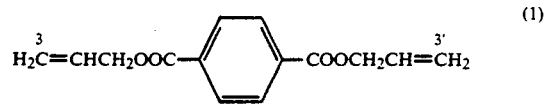

(1)

and an aromatic benzyl hydrocarbon having at least one hydrogen atom at the benzyl position and represented by the following formula (2)

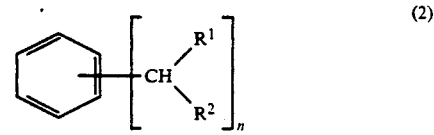

(2)

wherein each of $R^1$ and $R^2$ represents a member selected from the class consisting of a hydrogen atom and lower alkyl groups, and n is an integer of 1 to 3, and (A-3) a mixture of (A-1) and (A-2), (B) 40 to 5% by weight of a polyacrylate or polymethacrylate of dipentaerythritol having at least 4 acryloyl or methacryloyl groups in the molecule and represented by the following formula

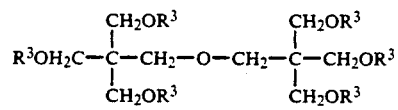

wherein each $R^3$ represents a hydrogen atom, —COCH=CH$_2$ or

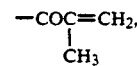

and at least four $R^3$ groups represent —COCH=CH$_2$ or

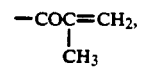

and (C about 1 to about 10 parts by weight of an organic peroxide as a curing agent per 100 parts by weight of the prepolymer or precopolymer(A).

It is an object of this invention therefore to provide a new type of thermosetting resin composition comprising a prepolymer or precopolymer of diallyl phthalate as a resin component which is useful for providing shaped articles having improved properties, and a shaple article from the composition having superior surface hardness and heat resistance and a process for preparation of the shaped article.

The above and other objects of the invention along with its advantages will become more apparent from the following description.

The prepolymer or precopolymer (A) used as the resin component in the composition of this invention is selected from the group consisting of A-1), (A-2) and (A-3).

The prepolymer of diallyl phthalate (A-1) is well known, and can be produced by a known method comprising polymerizing o-, m- or p-diallyl phthalate of the formula

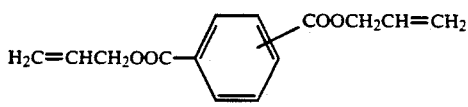

in solution or bulk in the presence of a radical initiator.

Preferably, the prepolymer (A-1) has an iodine value, measured by the Wjs method, of 55 to 95, a viscosity, determined at 30° C. for a 50% by weight methyl ethyl ketone solution, of 50 to 200 centipoises, and a number average molecular weight ($\overline{Mn}$), measured by gel permeation chromatography (GPC) and calculated as polystyrene, of 1,000 to 30,000. The prepolymer can be after-polymerized. The iodine value, viscosity and $\overline{Mn}$ can be properly selected depending upon the type (o-, m-, or p-) of diallyl phthalate. Preferably, the iodine value is 55 to 65 for the ortho-prepolymer, 65 to 90 for the iso-prepolymer and 85 to 95% for the terepolymer. The solution viscosity determined for a 50% by weight methyl ethyl ketone solution at 30° C. is preferably 70 to 110 centipoises for the ortho-prepolymer, 50 to 90 centipoises for the iso-prepolymer, and 50 to 200 centipoises for the tereprepolymer. The number averaged molecular weight calculated for polystyrene in accordance with the GPC method is preferably 2,000 to 20,000 for the ortho-prepolymer, 1,000 to 20,000 for the iso-prepolymer, and 2,000 to 30,000 for the tert-prepolymer.

The precopolymer (A-2) of diallyl terephthalate and an aromatic benzyl hydrocarbon and a method for its production are well known, and are described in detail, for example, in U.S. Pat. No. 4,518,764 (corresponding to British Patent 2,131,036). This U.S. patent is cited herein as reference instead of giving a detailed description of the component (A-2) and its production. Suitable precopolymers for use in this invention will be described below.

The precopolymer (A-2) used as a resin component in this invention is a precopolymer of diallyl phthalate derived from terephthalate of the following formula (1)

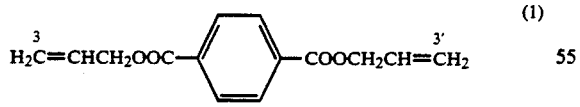

and an aromatic benzyl hydrocarbon having at least one hydrogen atom at the benzyl position and represented by the following formula (2)

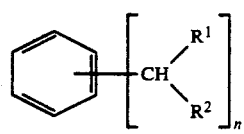

wherein each of $R^1$ and $R^2$ represents a member selected from the class consisting of a hydrogen atom and lower alkyl groups, and n is an integer of 1 to 3.

Preferably, the precopolymer (A-2) is a precopolymer of diallyl terephthalate having the following structural characteristics (a) and (b).

(a) The precopolymer has such a structure in which one monomeric unit of formula (2) is bonded to the allyl group of the monomeric unit of formula (1) at $C^3$, $C^{3'}$ or both $C^3$ and $C^{3'}$ through a carbon-carbon bond at the benzyl position.

(b) The number of the monomeric units of formula (1) at a carbon-carbon bonded molecular chain segment formed from the allyl groups of the monomeric unit of formula (1) in the precopolymer is from 3 to 11.

The structure of the precopolymer (A-2) is also described in detail in the above-cited U.S. Pat. No. 4,518,764. The structure of the precopolymer can be represented by the following formula ($A_1$) when toluene ($R^1=R^2=H$, n=1) is used as the compound of formula (2).

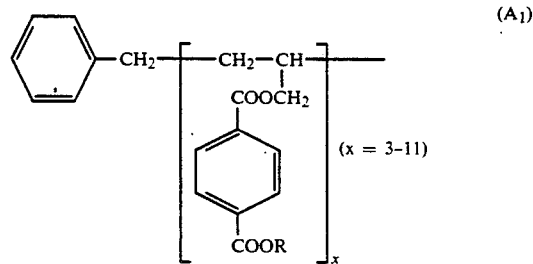

In formula ($A_1$), R represents an unreacted allyl group and/or a chain

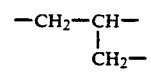

derived from the allyl group which constitutes another molecular chain segment of the precopolymer. An example is a structural portion represented by the following formula ($C_1$).

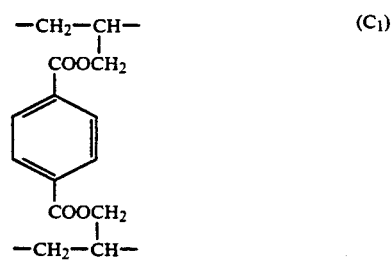

In the structural portion of formula ($A_1$), the number of the monomeric units of formula (1) in the carbon-carbon bonded molecular chain segment formed of the allyl group is 3 to 11 as shown in formula ($A_1$). This carbon-carbon bonded molecular chain segment may have a head-to-head bonded segment of formula ($B_2$) below

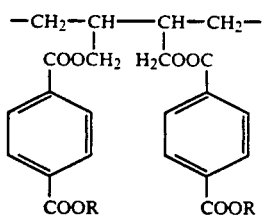

as well as the head-to-tail bond shown in formula ($A_1$), i.e., the bond of the following formula ($B_1$),

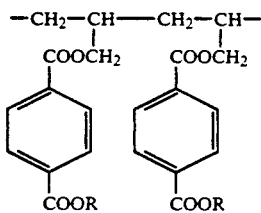

The monomer unit of formula (1) in the structural portion of formula ($C_1$) above constitutes a branching point of bonding the two structural portions of formulae ($B_1$) and ($B_2$) via two ester linkages.

When R is an unreacted allyl group, the structural portion can be represented by the following formula ($C_2$).

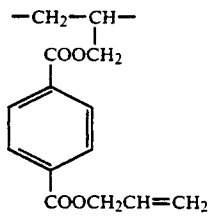

The structural portion of formula ($C_2$) constitutes a crosslinking site in the curing of the diallyl terephthalate precopolymer.

In the present invention, the precopolymer (A-2) preferably further has (c) an iodine value, measured by the Wijs method, of 40 to 85, (d) a true specific gravity at 25° C. of 1.20 to 1.25, (e) a softening temperature range of about 50° C. to about 120° C., (f) a viscosity, determined at 30° C. for a 50% by weight methyl ethyl ketone solution, of 80 to 300 centipoises, (g) a number average molecular weight ($\overline{Mn}$) of from 4,000 to 10,000 and a weight average molecular weight ($\overline{Mw}$) of from 70,000 to 200,000 measured by gel permeation chromatography (GPC) and calculated as polystyrene, and a molecular weight distribution, represented by the ratio of $\overline{Mn}$ to $\overline{Mw}$, of from 10 to 40, and (h) a Brabender melt viscosity, measured by Brabender plastography, of from 250 to 2,6000 m.g., and a processing time, measured by Brabender plastography, of from 5 to 65 minutes.

The production of the precopolymer (A-2) described above is described in the above-cited U.S. Pat. No. 4,518,764. For example, it can be produced by copolymerizing the aromatic hydrocarbon of formula (2) and the diallyl terephthalate of formula (1) in the presence of a catalyst such as an organic peroxide or an azo compound while properly choosing and setting such reaction conditions as to provide a precopolymer preferably having the structural characteristics (a) and (b) and preferably the properties (c) to (h) as well.

Each of $R^1$ and $R^2$ in formula (2) representing the aromatic hydrocarbon is selected from a hydrogen atom and lower alkyl groups. The lower alkyl groups may be $C_1$-$C_5$ alkyl groups.

Examples of the compound of formula (2) include toluene, ethylbenzene, n-propylbenzene, isopropylbenzene, n-butylbenzene, isobutylbenzene, sec-butylbenzene, n-amylbenzene, sec-amylbenzene, isoamylbenzene, (2-methylbutyl -benzene, o-xylene, m-xylene, p-xylene, xylene isomeric mixture, pseudocumene, 1,2-diethylbenzene, 1,3-diethylbenzene, 1,4-diethylbenzene, 1,2-dipropylbenzene, 1,3-dipropylbenzene, 1,4-dipropylbenzene, diisopropylbenzenes, p-cymene, 1,2-dibutylbenzene, 1,3-dibutylbenzene, 1,4-dibutylbenzene, 1,2-diisoamylbenzene, 1,3-diisoamylbenzene, 1,4-diisoamylbenzene, and 1,2,3-trimethylbenzene.

Examples of the organic peroxide and azo compound used as a catalyst in forming the diallyl terephthalate copolymer (A-2) include dialkyl peroxides such as di-tert-butyl peroxide, di-sec-butyl peroxide, tertbutyl-sec-butyl peroxide, and dicumyl peroxide; diaryl peroxides; diacyloyl or diacyl peroxides such as benoyl peroxide; alkyl esters of percarboxylic acids such as di-tert-butyl peroxalate and tert-butyl perbenzoate; azo compounds such as 2,2'-azobisisobutyronitrile, 2,2'-azobis-(2-methylbutyronitrile), 2,2'-azobis-(2-methylheptanitrile), 1,1'-azobis-(1-cyclohexylcarbonitrile), methyl 2,2'-azobisisobutyrate, 4,4'-azobis-(4-cyanopentanoic acid), and azidobenzene; and hydroperoxides such as tert-butyl hydroperoxide, sec-butyl hydroperoxide, tetralin hydroperoxide, cumyl hydroperoxide, benzylhydroperoxide, benzhydryl hydroperoxide, decalin hydroperoxide, acetyl peroxide, cyclohexyl hydroperoxide, and n-decyl hydroperoxide. Furthermore, compounds which are susceptible to oxidation with molecular oxygen may also be used. For example, the diallyl terephthalate, the aromatic hydrocarbon of formula (2) having at least one hydrogen atom at the benzyl position, and the copolymer of this invention correspond to such oxidizable compounds. If they undergo oxidation with air or oxygen in advance or during the copolymerization reaction to form a peroxide, they can also be used as a catalyst for the copolymerization reaction.

The use of the diallyl terephthalate precopolymer (A-2) in the composition of this invention is effective for imparting higher impact strength to a laminated board or a shaped article and is preferred. The height of fall leading to breakage in a falling dart test, representing the impact strength, of a cured product of the diallyl o-phthalate prepolymer is 70 mm at most, whereas that of a cured product of the diallyl terephthalate precopolymer is as high as about 180 mm.

In the composition of this invention, the diallyl phthalate prepolymer (A-1), or the diallyl terephthalate precopolymer (A-2), or a mixture (A-3) of both in an arbitary ratio may be used. In the mixture, the diallyl terephthalate precopolymer (A-2) is preferably present in an amount of at least 1% by weight, preferably at least 5% by weight, more preferably at least 20% by weight, in order to secure good impact strength of the diallyl terephthalate precopolymer.

In addition to the prepolymer or precopolymer (A) as an essential resin ingredient, the thermosetting resin composition of this invention may contain a minor amount of another resin compatible with the component (A). For example, an unsaturated polyester resin may further be incorporated in order to obtain a good speed of curing and an excellent affinity for fillers, and increase economic effects. The amount of the unsaturated polyester to be mixed is preferably not more than 40% by weight based on the total amount of component (A) and the unsaturated polyester resin. If it is mixed in an amount exceeding 40% by weight, it greatly deteriorates the excellent inherent properties of the diallyl phthalate prepolymer (A-1) or the diallyl terephthalate precopolymer (A-2), and undesirably reduces the moisture resistance of a laminated board or a molded article produced from the resulting thermosetting resin composition.

Examples of the unsaturated polyester resin are unsaturated polyester resins obtained by reacting a mixture of at least one polybasic unsaturated acid such as maleic acid, fumaric acid and itaconic acid and at least one polybasic saturated acid such as phthalic anhydride, isophthalic acid, terephthalic acid, adipic acid and succinic acid and at least one polyhydric alcohol such as diethylene glycol, propylene glycol, dipropylene glycol and neopentyl glycol. Preferably, the unsaturated polyester resin has an acid value of about 5 to 100 and is a viscous liquid at ordinary temperature (18°–25° C.) or a solid having a softening point of not more than 150° C.

The resin component (A) in the composition of this invention may be mixed with a vinyl monomer which serves to increase the crosslinking density of the resin during curing. The amount of the vinyl monomer mixed is preferably not more than 5% by weight based on the total amount of it and the component (A). If it exceeds 5% by weight, disadvantages may arise. For example, the curing speed will be unduly retarded at the time of curing the resin, or the curing shrinkage increases to increase the internal distortions of the molded product.

Examples of the vinyl monomer include allyl esters such as diallyl ortho-phthalate, diallyl isophthalate and diallyl terephthalate; styrene monomers such as styrene and alpha-chlorostyrene; and acrylate monomers such as methyl acrylate, methyl methacrylate, butyl acrylate, butyl methacrylate, ethylene glycol diacrylate, ethylene glycol dimethacrylate, propylene glycol diacrylate and propylene glycol dimethacrylate.

The thermosetting resin composition of this invention contains (B) a polyacrylate or polymethacrylate of dipentaerythritol having at least four acryloyl or methacryloyl groups in the molecule as an essential ingredient in combination with the prepolymer or precopolymer (A) selected from (A-1), (A-2) and (A-3).

The component (B) is represented by the following formula

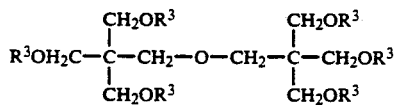

wherein each $R^3$ represents a hydrogen atom, —COCH=CH$_2$ or

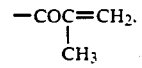

and at least four $R^3$ groups are —COCH=CH$_2$ or

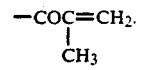

The component (B), in combination with the component (A), serves to improve greatly the surface hardness and heat resistance (particularly cigarette resistance) of a laminated board or a molded article produced from the thermosetting resin composition of this invention. Examples of the component (B) include dipentaerythritol dihydroxytetraacrylate, dipentaerythritol dihydroxytetramethacrylate, dipentaerythritol monohydroxypentaacrylate, dipentaerythritol monohydroxypentamethacrylate, dipentaerythritol hexaacryate and dipentaerythritol hexamethacrylate. They may be used singly or in combination.

When a dipentaerythritol poly(metha)acrylate having three or less acryloyl or methacryloyl groups is used as the component (B) of the composition of this invention, the surface hardness and heat resistance of a laminated board or a shaped article produced from the composition cannot be fully improved, and in addition, the moisture resistance of the laminated board or the molded article is markedly reduced.

The mixing proportion of the component (A) is 60 to 95% by weight, preferably 70 to 90% by weight, and the mixing proportion of the component (B) is 40 to 5% by weight, preferably 30 to 10% by weight. If the proportion of the component (B) is less than 5% by weight, the effect of improving the properties is not sufficient. If it exceeds 40% by weight, the composition is liable to undergo blocking at the time of molding, and the molded product has an increased shrinkage. Hence, precise molding becomes impossible. Or the impact strength of the laminated board or the molded article is reduced.

The incorporation of the dipentaerythritol poly(-meth)acrylate as component (B) in the composition of this invention is also effective for increasing curing at the time of molding, and consequently, shortens the molding cycle.

A curing agent may also be incorporated in the composition of this invention in order to facilitate curing of the resin component (A) and enhance the cross-linking effect by component (B). Known curing agents, for example organic peroxides used to cure the diallyl phthalate prepolymer or precopolymer, are preferably used as the curing agent. Specific examples include benzoyl peroxide, t-butyl peroxybenzoate, dicumyl peroxide, methyl ethyl ketone peroxide, cyclohexanone peroxide, cumene hydroperoxide, lauroyl peroxide, t-butyl peroxyacetate, t-butyl peroxypivalate and t-butyl peroxyoctoate. Benzoyl peroxide, t-butyl peroxybenzoate and dicumyl peroxide are preferred. The amount of the curing agent to be added may be properly selected, and is, for example, 1 to 10 parts by weight per 100 parts by weight of the prepolymer or precopolymer (A).

Depending upon the end uses of laminated boards and other shaped articles to be prepared from the thermosetting resin composition, various additives may further be incorporated in the resin composition. Examples of the additives are fillers, polymerization accelerators, polymerization inhibitors, internal mold releasing agents, coupling agents, pigments, and fire retardants.

The fillers may be inorganic and/or organic fillers which may be used singly or in combination. The amount of the fillers used is, for example, about 1 to about 500% by weight based on the weight of the resin component (A). Specific examples include inorganic fillers such as talc, mica, asbestos, glass powder, silica, clay, sirasu, titanium oxide, magnesium oxide, calcium carbonate, alumina, aluminum hydroxide, asbestos fibers, silica fibers, glass fibers, silicate glass fibers, alumina fibers, carbon fibers, boron fibers, beryllium fibers, steel fibers, and whiskers; and organic fillers such as natural fibers (e.g., cellulose), pulp, acrylic fibers, polyester fibers (e.g., polyethylene terephthalate fibers), cotton, rayon and polyvinyl alcohol fibers (e.g., Vinylon).

Examples of the polymerization accelerators are metal soaps, for example cobalt, vandadium and manganese salts of naphthenic acid and octoic acid, and aromatic tertiary amines such as dimethylaniline and diethylaniline. The amount of the polymerization accelerators is, for example, about 0.005 to about 6% by weight based on the weight of the resin component (A) of this invention.

Examples of the polymerization inhibitors are quinones such as p-benzoquinone and naphthoquinone, polyhydric phenols such as hydroquinone, p-tert-butylcatechol, hydroquinone monomethyl ether and p-cresol, and quaternary ammonium salts such as trimethyl ammonium chloride. The amount of the polymerization inhibitors is, for example, about 0.001 to about 0.1% by weight based on the weight of the resin component (A).

Examples of the internal mold releasing agents are metal salts of stearic acid, such as calcium stearate, zinc stearate and magnesium stearate. The amount of the internal mold releasing agent is, for example, about 1 to about 5% by weight, based on the weight of the resin component (A).

Examples of the coupling agents are gamma-methacryloxypropyltrimethoxysilane, vinyltriethoxysilane and allyltrimethoxysilane. The amount of the coupling agents is about 0.01 to about 3% by weight based on the weight of the resin component (A).

The pigments include, for example, carbon black, iron black, Cadmium Yellow, Benzidine Yellow, Cadmium Orange, red iron oxide, Cadmium Red, Cobalt Blue, and anthraquinone blue. The amounts of the pigments is, for example, about 0.1 to about 10% by weight based on the weight of the resin component (A).

Examples of the fire retardants include inorganic compounds such as antimony oxide and aluminum hydroxide, phosphorus-containing compounds such as tris(chloroethyl) phosphate, tris(2-bromo-3-chloropropyl) phosphate and ammonium polyphosphate, chlorine-containing compounds such as chlorinated paraffin and diallyl chlorendate, and bromine-containing compounds such as decabromodiphenyl ether and tetrabromophthalic anhydride. These compounds are known to be fire retargents for diallyl phthalate-type resins. The amount of the fire retardants used is, for example, about 1 to about 30% by weight based on the weight of the resin component (A).

In utilizing the composition of this invention for the production of a laminated board, the composition may be dissolved in a suitable organic solvent to prepare an impregnating resin solution. The solvent may, for example, include ketones such as acetone, methyl ethyl ketone and ethyl isobutyl ketone, aromatic compounds such as benzene, toluene, xylene and isopropylbenzene, and esters such as ethyl acetate and butyl acetate. The resulting solution may be coated or impregnated on or in a substrate such as printed paper, a woven fabric, a non-woven fabric or a single wooden plate so that the total non-volatile content (i.e., the amount of the composition excepting the solvent) in the substrate impregnated with the composition of this invention is in the range of 30 to 90% by weight depending upon the end use of the resulting laminated board. After drying, the resin-impregnated substrate is overlaid on the surface of, for example, a plywood, a particle board, a hard board, a cement-asbestos board, a gypsum board or a resin-impregnated kraft paper, and the entire assembly are molded under heat and pressure to obtain the desired laminated board. Alternatively, the above resin-impregnated substrate may be heated to cure the resin, and then laminated to a metal plate such as an aluminum plate by using an adhesive to form a laminated board. It is also possible to stack two or more such resin-impregnated substrates and mold the assembly under heat and pressure to produce a laminated board. In this case, the substrates for resin impregnation may be the same, or may be a combination of two or more substrates different in color and material. If at this time, at least one substrate impregnated or coated with the composition of this invention is used as a surface layer of the laminated board, a resin-impregnated substrate in a lower layer need not to be one impregnated with the composition of this invention.

When the laminated board so obtained is cut along a plane crossing the laminated plane, the individual laminated layers appear in the cut surface. By utilizing the decorative effect of the laminated layers, the laminated board may be used, for example, for making interior decorative materials, interior finishing or trimming materials, furniture, fixtures and other various articles of handicraft.

The substrate for resin impregnation used in making the laminated boards may, for example, be a woven fabric, a non-woven fabric, paper or a mat composed of natural fibers or synthetic fibers, or a single wooden plate. Specific examples of materials for these substrates include natural fibers such as cellulose, cotton and asbestos, inorganic fibers such as ceramics, glass fibers and alumina fibers, and organic fibers such as polyamide fibers, polyimide fibers, polyimideamide fibers, polyester fibers, polyvinyl alcohol fibers and acrylic fibers. These substrates are often used in practice in a basis weight of 10 to 200 g/m$^2$ and a thickness of 0.02 to 1 mm. They may be printed or non-printed. A single wooden plate obtained by slicing tung, birch-tree, lauan, ash, beech-tree, cherry, etc. to a thicknesss of 0.1 to 3 mm may also be used as the substrate for resin impregnation.

The molding conditions for the production of laminated boards may be those known for the production of laminatd boards using as a diallyl phthalate prepolymer or precopolymer as a resin component. For example, by molding at a temperature of 100° to 160° C. under a pressure of 1 to 100 kg/cm$^2$ for 1 to 60 minutes, laminated boards having good surface hardness and heat resistance intended by this invention can be obtained.

When the composition of this invention is to be used as a raw material for production of shaped articles, for example, electric or electronic component parts, machine parts, daily goods such as tableware, and medical materials, the composition may be mixed by using a known mixing machine such as a mixing and grinding machine and a Henschel mixer. The mixture is then kneaded for 2 to 30 minutes in a roll mill or a kneader heated at 50° to 110° C. and then pulverized to form a raw materials for various molding methods such as compression molding, transfer molding and injection molding. Molding conditions suitable for the respective methods may be employed. For example, compression molding requires a mold temperature of 150° to 170° C., a molding pressure of 50 to 100 kg/cm² and a curing time of 40 to 180 seconds per mm of the thickness of the molded article. Transfer molding is preferably carried out at a mold temperature of 150° to 170° C. under a molding pressure of 30 to 600 kg/cm² for a curing time of 30 to 120 seconds per mm of the thickness of the molded article.

Injection molding is preferably carried out under the following conditions:

| Cylinder temperature: | 50 to 100° C. (the front portion), 20 to 50° C. (the rear portion) |
|---|---|

Screw rotating speed: 30 to 80 rpm
Mold temperature: 160° to 180° C.
Molding pressure: 300 to 1500 kg/cm²
Curing time: 20 to 120 seconds per mm of the thickness of the molded article.

Molded articles obtained by the above molding methods have especially good surface hardness and heat resistance.

The following examples illustrate the present invention in detail.

EXAMPLES 1-3 AND COMPARATIVE EXAMPLES 1-5

In each run, the ingredients shown in Table 1 were well mixed to form an impregnating resin solution. Printed paper having a basis weight of 100 g/m² and printed on its entire surface in ivory was immersed in the resulting solution, then pulled up and dried at 80° C. for 5 minutes to obtain resin-impregnated paper having a solids pick up of 130 g/m².

Separately, the same diallyl orthophthlate prepolymer as shown in Table 1 was mixed with the curing agent shown in Table 1, and the mixture was dissolved in a mixed solvent of acetone and tolune. Two sheets of kraft paper having a basis weight of 140 g/m² was immersed in the resulting solution, and dried as above to obtain two sheets of kraft paper having a solids pick-up of 100 g/m².

The paper impregnated with the composition of this invention made as above was placed on the two sheets of resin-impregnated kraft paper. The assembly was introduced into a press kept at a hot plate temperature of 130° C. A glossy caul plate was placed on the printed surface side of the assembly, and the assembly was compressed under a pressure of 30 kg/cm², and cooled with water 20 minutes after the introduction into the press.

The surface plucking hardness and cigarette resistance of the resulting decorative board were measured by the following methods, and the results are shown in Table 1.

Surface Plucking Hardness

Ten specimens were subjected to Plucking Hardness A Test for a special plywood type F in accordance with JAS standards (Japanese Agricultural and Forestry Standards), and the average of the depths of injury on these specimens was calculated and defined as the surface plucking hardness.

Method: Each specimen was fixed horizontally to a fixing stand, and a load of 200 g or 300 g was applied by using a diamond needle. Three linear injuries having a length of 50 mm were provided on the surface of the specimen, and the depths of the injuries were measured.

Cigarette Resistance

The test specimen was placed with its decorative surface facing upward on a 10 mm-thick particle board (200 Type HDR, made by Eidai Sangyo Co., Ltd.; thickness 10 mm, ensity 0.74 g/cm³). Both ends of the specimen were fixed by a cellophane tape. A lighted cigarette was put on the specimen, and after standing for 2, 3, 4 or 5 minutes, that part on which the cigarette was placed was wiped with metanol, and the decorative surface of that part was observed for change in appearance. The result was evaluated on the following standard.

⊙: No change in color
○: No change in color but a trace existed
Δ: Change in color observed in the surface layer
X: Change in color observed to the deep layer portion. Partly carbonized and blisters or cracks occurred.

TABLE 1

|  | Example | | | Comparative Example | | | | | |
|---|---|---|---|---|---|---|---|---|---|
|  | 1 | 2 | 3 | 1 | 2 | 3 | 4 | 5-1 | 5-2 |
| Dially ortho-phthalate prepolymer (1) | 100 | 60 |  | 60 | 60 | 60 | 60 | 60 | 60 |
| Dially isophthalate prepolymer (2) |  |  | 50 |  |  |  |  |  |  |
| Dially terephthalate precopolymer (3) |  |  | 50 |  |  |  |  |  |  |
| Unsaturated polyester resin (4) |  | 40 |  | 40 | 40 | 40 | 40 | 40 | 40 |
| Dipentaerythritol monohydroxypentaacrylate | 10 |  |  |  |  |  |  |  |  |
| Dipentaerythritol monohydroxypentamethacrylate |  | 15 | 15 |  |  |  |  |  |  |
| Dipentaerythritol dihydroxytetraacrylate | 5 |  |  |  |  |  |  |  |  |
| Dipentaerythritol hexaacrylate | 5 | 15 | 15 |  |  |  |  |  |  |
| Dipentaerythritol trihydroxytriacrylate |  |  |  |  | 30 |  |  |  |  |
| Glycerol trimethacrylate |  |  |  |  |  | 30 |  |  |  |
| Trimethylolpropane methacrylate |  |  |  |  |  |  | 30 |  |  |
| Pentaerythritol tetraacrylate |  |  |  |  |  |  |  | 30 |  |
| Tris(methacryloxy)isocyanurate |  |  |  |  |  |  |  |  | 30 |
| Benzoyl peroxide | 3 | 3 | 3 | 3 | 3 | 3 | 3 | 3 | 3 |
| Internal mold releasing agent (5) | 0.4 | 0.4 | 0.4 | 0.4 | 0.4 | 0.4 | 0.4 | 0.4 | 0.4 |

TABLE 1-continued

|  |  |  | Example | | | Comparative Example | | | | | |
| --- | --- | --- | --- | --- | --- | --- | --- | --- | --- | --- | --- |
|  |  |  | 1 | 2 | 3 | 1 | 2 | 3 | 4 | 5-1 | 5-2 |
| Hydroquinone |  |  | 0.06 | 0.06 | 0.06 | 0.06 | 0.06 | 0.06 | 0.06 | 0.06 | 0.06 |
| Fine silica powder (6) |  |  | 3 | 3 | 3 | 3 | 3 | 3 | 3 | 3 | 3 |
| Solvent (acetone:toluene = 3:1) |  |  | 150 | 150 |  | 150 | 150 | 150 | 150 | 150 | 150 |
| Solvent (methyl ethyl ketone:toluene = 3:1) |  |  |  |  | 150 |  |  |  |  |  |  |
| Surface properties | Plucking hardness (μm) | 200 g load | 2.5 | 2.3 | 2.0 | 10.2 | 3.5 | 3.9 | 4.5 | 2.5 | 12.5 |
|  |  | 300 g load | 7.4 | 6.9 | 5.9 | 35 | 11 | 13 | 15 | 8. | 20.5 |
|  | Cigarette resistance | 2 minutes | ⊚ | ⊚ | ⊚ | X | Δ | ⊚ | ⊚ | ⊚ | Δ |
|  |  | 3 minutes | ⊚ | ⊚ | ⊚ | X | X | Δ | Δ | ○ | x |
|  |  | 4 minutes | ○ | ○ | ○ | X | X | X | X | Δ | x |
|  |  | 5 minutes | Δ | Δ | Δ | X | X | X | X | X | x |

Notes (1) to (6) to Table 1
(1) A prepolymer having a viscosity, determined at 30° C. for a 50% by weight methyl ethyl ketone solution, of 96.5 centipoises, an iodine value, determined by the Wijs method, of 56.7, and a number average molecular weight, in accordance with the GPC method, of 5,100.
(2) A prepolymer having a viscosity, determined at 30° C. for a 50% by weight methyl ethyl ketone solution, of 77 centipoises, an iodine value, determined by the Wijs method, of 83.0, and a number average molecular weight, in accordance with the GPC method, of 4,700.
(3) The precopolymer of Production Example 2 shown in Table 2 below.
(4) A commercial unsaturated polyester resin having an acid value of 34.5 and produced from 1 mole of maleic acid, 1 mole of phthalic acid and 2 moles of propylene glycol.
(5) "DR-2OS", a tradename for a product of Osaka Soda Co., Ltd.
(6) "Carplex", a tradename for a product of Shionogi Pharmaceutical Co., Ltd.

EXAMPLES 4–10 AND COMPARATIVE EXAMPLES 6–13

In each run, the ingredients shown in Table 3 were mixed by a Henschel mixer, kneaded for 2 to 30 minutes by a roll mill heated at 50° to 110° C., and then pulverized by a hammer mill to form a molding material.

In Comparative Example 9 in which the amount of dipentaerythritol hexaacrylate was excessively large, the molding material was sticky during pulverization and sticked to the hammer and the screen. Thus, it could not be pulverized smoothly. Moreover, when it was left to stand for a day at room temperature (23° C.), it underwent blocking.

The resulting molding material was tested for the various properties shown in Table 4. The testing methods were as follows:

Required Curing Time

The molding material was compression-molded into a circular plate having a diameter of 100 mm and a thickness of 1 mm at mold temperature of 160° C. under a molding pressure of 100 kg/cm². The molded article was immersed for 1 hour in boiling chloroform, and then the surface condition of the molded article was observed. The molding time which did not cause surface roughening or glossing was determined as the rquired curing time per unit thickness of the molded article.

Rockwell hardness [(M scale), ASTM D785], flexural strength (ASTM D790), Charpy impact value (V notched), ASTM D256, heat distortion temperature (18.5 kg/cm², ASTM D648] and volume resistivity [after boiling, ASTM D257]

These tests were conducted in accordance with ASTM. The test pieces were prepared by molding at a mold temperature of 160 ° C. under a molding pressure of 100 kg/cm². The molding time was one obtained by multiplying the above required curing time by the thickness of the test piece.

The resins shown in Table 3 were as follows:

Diallyl ortho-phthalate prepolymer and diallyl isophthalate prepolymer were the same as those shown in Table 1.

Unsaturated polyester resin was an unsaturated polyester resin having an acid value of 28.0 and a softening temperature of 80° C. and produced from 0.5 mole of maleic anhydride, 0.5 mole of phthalic anhydride and 1 mole of propylene glycol.

The diallyl terephthalate precopolymers (1) and (2) were produced respectively in Production Example 1 and Production Example 2 shown below.

There was used a jacketed stainless steel (SUS 304) polymerization vessel having an inside diameter of 600 mm and a capacity of 120 liters and equipped with a turbine blade-type variable stirrer, a double-tube feed nozzle for feeding monomers and a catalyst, a nitrogen purge opening, a leak valve, a sampling port, a thermometer and a pressure gauge. The double-tube type feed nozzle for feeding monomers and a catalyst was secured to that part of the body portion of the polymerization vessel which was below the liquid surface, and the inside diameter of its outside tube was adjusted to 1.5 mm at a part beginning with a site before entry into the polymerization vessel so as to minimize the residence time in the feed pipe. Three such nozzles were provided in order to cope with nozzle blockage. The sampling port was also provided in the body portion of the polymerization vessel so that during the polymerization, the liquid layer could be sampled by utilizing the inner pressure of the polymerization vessel. An oil-rotating type vacuum pump and a nitrogen containing bottle were connected to the nitrogen purge opening so that they could be switched as required.

Sixty kilograms of aromatic hydrocarbon (HC) of formula (2) shown in Table 2 below was charged into the polymerization vessel, and at room temperature, the inside pressure of the polymerization vessel was reduced by the vacuum pump, and then returned to atmospheric pressure by using nitrogen gas. This operation was repeated three times to replace air in the vessel by nitrogen. The pressure was then again reduced, and the polymerization vessel was closed. The stirrer was started and while stirring at 240 rpm, steam was passed through the jacket, and the temperature of the vessel was raised to 140° C.

The stirring speed was increased to 720 rpm. Diallyl terephthalate and a (0.5:1 by mole) mixture of di-tert-butyl peroxide (DTBPO) and the aromatic hydrocarbon (HC) of formula (2) were simultaneously fed into the polymerization vessel at predetermined speeds from the outside tube of the double tube type nozzle by means of pump under a discharge pressure of 70 kg/cm². During this time, steam was adjusted so that the polymerization vessel was maintained at 140° C.

Diallyl terephthalate (DAT) of formula (1) to be fed was cooled at 15° C., and the mixture of di-tert-butyl peroxide and the aromatic hydrocarbon was cooled at 5° C. Lines leading to the polymerization vessel was maintained cool. The pressure of the polymerization vessel was 0.3 to 2 kg/cm$^2$-G. When feeding of predetermined amounts of diallyl terephthalate, the aromatic hydrocarbon and di-tert-butyl peroxide was over, supplying of steam was stopped, and the stirring speed was lowered to 240 rpm. Cooling water was passed through the jacket to cool the vessel. After it was cooled to near room temperature, the leak valve was opened to return the pressure to atmospheric pressure and the polymerization reaction was terminated.

During the polymerization, the reaction mixture was sampled properly, and the reaction was monitored by the refractive index and GPC of the sampled product.

The speeds and amounts of the diallyl terephthalate, aromatic hydrocarbon and di-tert-butyl peroxide fed are shown in Table 2.

Volatile material were evaporated from the resulting polymerization reaction solution by using a thin film-type evaporator, and the weight ratio of the unreacted aromatic hydrocarbon in the evaporation residue to the sum of the copolymer and the unreacted diallyl terephthalate was adjusted to 0.3:1. Then, the evaporation residue was added dropwise to a stirring vessel charged with 5 times the weight of the fed diallyl terephthalate of methanol and stirred to precipitate the copolymer. The precipitated copolymer was well washed with the same amount of methanol, filtered, dried and pulverized to form a powdery copolymer.

The yield and properties of the copolymer are shown in Table 2.

TABLE 2

| Production Example | 1 | 2 |
|---|---|---|
| Aromatic hydrocarbon (HC) of formula (2) | Ethylbenzene | Xylene |
| Initial amount of charge of HC (kg) | 60 | 60 |
| Speed of feeding of diallyl terephthalate of formula (1) (DAT) (g/hr) | 247.0 | 275.0 |
| Speed of feeding of the mixture of HC and di-tert-butyl peroxide (DTBPO) (g/hr) | 60 | 80 |
| Amount of DAT fed (mole) | 30 | 30 |
| Amount of HC fed (mole) | 10 | 12 |
| Amount of DTBPO fed (mole) | 5 | 6 |
| Yield of the copolymer (%) | 82 | 73 |
| Structure of (b) [the number of monomers of formula (1)] | 4.3 | 3.5 |
| Wijs method iodine vaue | 49 | 3.5 |
| True specific gravity (25° C.) | 1.215 | 1.225 |
| Number average molecular weight (Mn) by the GPC method (*1) | 5500 | 6800 |
| Weight average molecular weight (Mw) by the GPC method | 88000 | 118000 |
| Mw/Mn | 16 | 17 |
| Softening temperature (° C.) (*2) | 63–76 | 80–89 |
| Solution viscosity (50 wt. % methyl ethyl ketone, 30° C.) (cps) | 81 | 162 |
| Brabender plastograph (*3) | | |
| Brabender melt viscosity (m · g) | 550 | 1850 |
| Processing time (minutes) | 40 | 11 |

Notes to Table 2
(*1): Calculated for polystyrene by gel permeation chromatography using a device 150CGPC made by Waters Co.
(*2): A light transmission type automatic melting point measuring device ("PF 61, made by Metler Co.) was used.
(*3): Measured values obtained by a Brebender Plastography made by Brebender Co. (Germany)
Capacity of a kneading chamber: 50 cc
Rotor type: W50H
Sample: 50 g of the sample + 0.5 of zinc stearate
Temperature of the kneading chamber: 130° C.
Roter speed: 22 rpm The kneading was carried out under the above conditions until the kneading resistance reached 5000 m.g. From the torque curve on a recording sheet, the minimum torque value was defined as the Brebender melt viscosity, and the time from the termination of sample charging until a kneading resistance of 5000 m.g. was reached was defined as the processing time.

In Table 3, the silane coupling agent was "A-174" of Japan Unicar Co., and glass fibers made by Asahi Fiber Glass Co. were used.

The molding material prepared from each of the compositions of the Examples and Comparative Examples was injection-molded into 36-pin square connectors at a mold temperature of 170° C. under an injection pressure of 1000 kg/cm$^2$ with the front portion of the cylinder adjusted to 80° C. using a two-cavity mold.

The connectors were subjected to a deflasher to examine whitening of their surfaces. The results are shown in Table 4.

Walnut shells were used as the deflasher, and deflashing was carried out under a pneumatic pressure of 5 kg/cm$^2$ with a spraying time of 30 seconds.

The molding material in Comparative Example 9 underwent heavy blocking, and therefore, bridged in a material feed hopper. Thus, the feeding of the raw material could not be performed smoothly, and connectors could not be molded.

A test piece (a circular plate having a diameter of 100 mm and a thickness of 3 mm) was prepared from each of the molding materials prepared from the compositions shown in Table 3 was prepared by compression molding. The surface of the test piece was rubbed with a steel wool mat (BONSTAR No. 0000, made by Japan Steel Wool Co., Ltd.) 100 times, and change in the surface gloss was measured. The result is shown as gloss retention in FIG. 4. The gloss was measured by a glossmeter (model VG-2PD made by Nippon Denshoku Kogyo Co., Ltd.) at an incidence angle of 60°.

TABLE 3

| | Example | | | | | | |
|---|---|---|---|---|---|---|---|
| | 4 | 5 | 6 | 7 | 8 | 9 | 10 |
| Dially ortho-phthalate prepolymer | 95 | 65 | 60 | | | 80 | |
| Dially isophthalate prepolymer | | | | 80 | | | 35 |
| Diallyl terephthalate precopolymer | | | | | (2) 80 | | (1) 35 |
| Unsaturated polyester resin | | | 20 | | | | |
| Diallylortho-phthalate monomer | 5 | | | | | | |
| Dipentaerythritol hexaacrylate | 10 | 35 | 20 | 20 | 20 | | 30 |
| Dipentaerythritol dihydroxytetramethacrylate | | | | | | 20 | |
| Dipentaerythritol trihydroxytriacrylate | | | | | | | |

TABLE 3-continued

Pentaerythritol tetraacrylate
Trimethylolpropane trimethacrylate
Glycerol trimethacrylate

| | Comparative Example | | | | | | | |
|---|---|---|---|---|---|---|---|---|
| | 6 | 7 | 8 | 9 | 10 | 11 | 12 | 13 |
| Diallyl ortho-phthalate prepolymer | 95 | | | 50 | 65 | 65 | 65 | 65 |
| Diallyl isophthalate prepolymer | | 100 | | | | | | |
| Diallyl terephthalate precopolymer | | | (2) 100 | | | | | |
| Unsaturated polyester resin | | | | | | | | |
| Diallylortho-phthalate monomer | 5 | | | | | | | |
| Dipentaerythritol hexaacrylate | | | | 50 | | | | |
| Dipentaerythritol dihydroxytetramethacrylate | | | | | | | | |
| Dipentaerythritol trihydroxytriacrylate | | | | | 35 | | | |
| Pentaerythritol tetraacrylate | | | | | | 35 | | |
| Trimethylolpropane trimethacrylate | | | | | | | 35 | |
| Glycerol trimethacrylate | | | | | | | | 35 |

| | Example | | | | | | |
|---|---|---|---|---|---|---|---|
| | 4 | 5 | 6 | 7 | 8 | 9 | 10 |
| Dicumyl peroxide | 2 | 2 | 2 | 2 | 2 | 2 | 2 |
| Hydroquinone | 0.01 | 0.01 | 0.01 | 0.01 | 0.01 | 0.01 | 0.01 |
| Silane coupling agent | 0.6 | 0.6 | 0.75 | 0.75 | 0.75 | 0.6 | 0.75 |
| Heavy calcium carbonate (average size 2) | 40 | 40 | 75 | 75 | 75 | 40 | 75 |
| Glass fibers | 60 | 60 | 75 | 75 | 75 | 60 | 75 |
| Zinc stearate | 2 | 2 | 2 | 2 | 2 | 2 | 2 |
| Carbon black | 1 | 1 | 1.2 | 1.2 | 1.2 | 1 | 1.2 |
| Kneading conditions | | | | | | | |
| Roll temperature (°C.) | 80 | 60 | 70 | 70 | 70 | 80 | 70 |
| Kneading time (minutes) | 10 | 10 | 10 | 10 | 10 | 10 | 10 |

| | Comparative Example | | | | | | | |
|---|---|---|---|---|---|---|---|---|
| | 6 | 7 | 8 | 9 | 10 | 11 | 12 | 13 |
| Dicumyl peroxide | 2 | 2 | 2 | 2 | 2 | 2 | 2 | 2 |
| Hydroquinone | 0.01 | 0.01 | 0.01 | 0.01 | 0.01 | 0.01 | 0.01 | 0.01 |
| Silane coupling agent | 0.6 | 0.75 | 0.75 | 0.6 | 0.6 | 0.6 | 0.6 | 0.6 |
| Heavy calcium carbonate (average size 2) | 40 | 75 | 75 | 40 | 40 | 40 | 40 | 40 |
| Glass fibers | 60 | 75 | 75 | 60 | 60 | 60 | 60 | 60 |
| Zinc stearate | 2 | 2 | 2 | 2 | 2 | 2 | 2 | 2 |
| Carbon black | 1 | 1.2 | 1.2 | 1 | 1 | 1 | 1 | 1 |
| Kneading conditions | | | | | | | | |
| Roll temperature (°C.) | 90 | 80 | 100 | 50 | 60 | 60 | 60 | 60 |
| Kneading time (minutes) | 5 | 5 | 5 | 10 | 10 | 10 | 10 | 10 |

(1): The precopolymer in Production Example 1 of Table 2.
(2): The precopolymer in Production Example 2 of Table 2.

TABLE 4

| | Example | | | | | | |
|---|---|---|---|---|---|---|---|
| | 4 | 5 | 6 | 7 | 8 | 9 | 10 |
| Required curing time (sec/mm) | 110 | 90 | 100 | 40 | 150 | 105 | 70 |
| Rockwell hardness (M scale) | 108 | 113 | 110 | 116 | 106 | 110 | 109 |
| Flexural strength (kg/mm$^2$) | 9.4 | 9.0 | 10.2 | 9.6 | 9.1 | 9.4 | 9.4 |
| Charpy impact value (V notch) (kg-cm/cm$^2$) | 3.9 | 3.2 | 4.5 | 2.7 | 5.5 | 3.5 | 5.3 |
| Heat distortion temperature (°C.) | 190 | 215 | 192 | 295 | 180 | 195 | 210 |
| Volume resistivity (after boiling) (ohms-cm) | $6 \times 10^{15}$ | $5 \times 10^{15}$ | $1 \times 10^{15}$ | $7 \times 10^{15}$ | $9 \times 10^{15}$ | $2 \times 10^{15}$ | $8 \times 10^{15}$ |
| Whitening by a deflasher | No | No | No | No | No | No | No |
| Gloss retention (%) after 100 rubbings with steel wool | 81 | above 90 | 85 | above 90 | 80 | 87 | 85 |

| | Comparative Example | | | | | | | |
|---|---|---|---|---|---|---|---|---|
| | 6 | 7 | 8 | 9 | 10 | 11 | 12 | 13 |
| Required curing time (sec/mm) | 120 | 50 | 180 | 80 | 115 | 110 | 115 | 115 |
| Rockwell hardness (M scale) | 102 | 110 | 100 | 115 | 103 | 106 | 103 | 103 |
| Flexural strength (kg/mm$^2$) | 9.2 | 9.5 | 9.4 | 8.6 | 9.0 | 9.0 | 9.2 | 9.1 |
| Charpy impact value (V notch) (kg-cm/cm$^2$) | 4.0 | 2.8 | 5.9 | 1.7 | 3.7 | 3.5 | 3.6 | 3.8 |
| Heat distortion temperature (°C.) | 180 | 280 | 155 | 228 | 185 | 190 | 185 | 185 |
| Volume resistivity (after boiling) (ohms-cm) | $6 \times 10^{15}$ | $8 \times 10^{15}$ | $1 \times 10^{16}$ | $5 \times 10^{15}$ | $4 \times 10^{13}$ | $6 \times 10^{15}$ | $3 \times 10^{15}$ | $4 \times 10^{15}$ |
| Whitening by a deflasher | Yes | Yes | Yes | —* | Yes | Yes | Yes | Yes |
| Gloss retention (%) after 100 rubbings with steel wool | below 50 | 65 | below 50 | above 90 | 65 | 70 | 67 | 63 |

*The test could not be conducted because the injection molding was impossible.

It is seen from Table 4 that molded articles obtained from the compositions of this invention containing dipentaerythritol poly(meth)acrylate in Examples 4 to 10 have much improved surface hardness without impairing the inherent properties of a cured product of diallyl phthalate prepolymer or diallyl terephthalate precopolymer. In contrast, the products of Comparative Examples 6 to 8 composed of a resin component alone without the dipentaerythritol poly(meth)acrylate had much lower surface hardness. In Comparative Example 9 in which the amount of dipentaerythritol hexaacrylate added was excessively large, the molding material had stickiness and poor handling property. In Comparative Example 10 in which dipentaerythritol trihydroxytriacrylate containing only three acryloyl groups in the molecule, the water resistance volume resistivity after boiling) of the resulting product was much deteriorated, and the effect of improving surface hardness was also low. In Comparative Examples 11 to 13 in which a conventional poly(meth)acrylate of a polyhydric alcohol was used, the effect of improving surface hardness was not sufficient.

We claim:

1. A thermosetting resin composition for obtaining a shaped article consisting essentially of, as resin components:

(A) 60 to 95% by weight of a prepolymer or precopolymer selected from the group consisting of (A-1), (A-2) and (A-3) below, (A-1) a prepolymer of diallyl phthalate, (A-2) a prepolymer of diallyl terephthalate derived from diallyl terephthalate of the following formula (1)

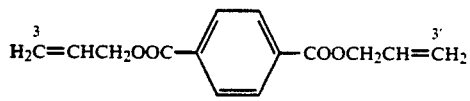

and an aromatic benzyl hydrocarbon having at least one hydrogen atom at the benzyl position and represented by the following formula (2)

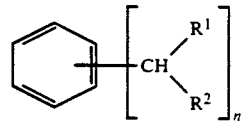

wherein each of $R^1$ and $R^2$ represents a member selected from the class consisting of a hydrogen atom and lower alkyl groups, and n is an integer of 1 to 3, and (A-3) a mixture of (A-1) and (A-2), and (B) 40 to 5% by weight of a polyacrylate or polymethacrylate of dipentaerythritol having at least 4 acryloyl or methacryloyl groups in the molecule and represented by the following formula

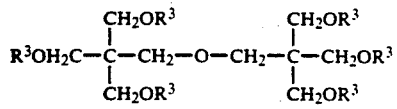

wherein each $R^3$ represents a hydrogen atom, $-COCH=CH_2$ or

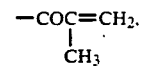

and at least four $R^3$ groups represent $-COCH=CH_2$ or

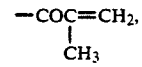

and (C) about 1 to about 10 parts by weight of an organic peroxide as a curing agent per 100 parts by weight of the prepolymer or precopolymer (A).

2. The composition of claim 1 wherein the prepolymer (A-1) has an iodine value, measured by the Wijs method, of 55 to 95, a viscosity, determined at 30° C. for a 50% by weight methyl ethyl ketone solution, of 50 to 200 centipoises, and a number average molecular weight ($\overline{Mn}$), measured by gel permeation chromatography and calculated as polystyrene, of 1,000 to 30,000.

3. The composition of claim 1 wherein the precopolymer (A-2) has the following characteristics (a) and (b), (a) the precopolymer (A-2) has such a structure that one monomeric unit of formula (2) is bonded to the allyl group of the monomeric unit of formula (1) at $C^3$, $C^{3'}$ or both $C^3$ and $C^{3'}$ through a carbon-carbon bond at the benzyl position, and (b) the number of the monomeric units of formula (1) at a carbon-carbon bonded molecular chain segment formed from the allyl groups of the monomeric unit of formula (1) in the precopolymer is from 3 to 11.

4. The composition of claim 3 wherein the precopolymer (A-2) further has the following characteristics (c) to (h), (c) it has an iodine value, measured by the Wijs method, of 40 to 85, (d) it has a true specific gravity at 25° C. of 1.20 to 1.25, (e) it has a softening temperature range of from about 50° C. to about 120° C., (f) it has a viscosity, determined at 30° C. for a 50% by weight methyl ethyl ketone solution, of 80 to 300 centipoises, (g) it has a number average molecular weight ($\overline{Mn}$) of from 4,000 to 10,000 and a weight average molecular weight ($\overline{Mw}$) of from 70,000 to 200,000, measured by gel permeation chromatography (GPC) and calculated as polystyrene, and a molecular weight distribution represented by the ratio of $\overline{Mn}$ to $\overline{Mw}$, of from 10 to 40, and (h) it has a Brabender melt viscosity, measured by Brabender plastography, of from 250 to 2,600 m.g, and a processing time, measured by Brabender plastography, of from 5 to 65 minutes.

5. The composition of claim 1 further comprising about 0.005 to about 6% by weight of a polymerization accelerator based on the weight of (A).

* * * * *